UNITED STATES PATENT OFFICE.

OTTO PRINZ, OF LINDENAU, NEAR LEIPSIC, GERMANY.

MORDANT.

SPECIFICATION forming part of Letters Patent No. 320,963, dated June 30, 1885.

Application filed March 12, 1884. (No specimens.)

*To all whom it may concern:*

Be it known that I, OTTO PRINZ, a citizen of Germany, and a resident of Lindenau, near Leipsic, in Germany, have invented a new Mordant for Dyeing and Printing and Process for Preparing the same, of which the following is a specification.

My invention relates to new mordants consisting of antimony compounds of the product resulting from the reaction of an alkaline substance upon carbo-hydrates. It also relates to the process of preparing said mordants, which process consists, essentially, in treating carbohydrates with alkaline substances, with or without the assistance of oxidizing agents, and then treating the acidulated solution with an antimony compound.

By the reaction of strong alkalies upon the so-called "carbon hydrates" in general, products are obtained the antimony compounds of which are soluble in water without decomposition. These products have not been isolated, but they may all be used for the production of antimony solutions, which may be used to advantage in dyeing and printing in all cases where at present tartrate of antimony is principally used.

In carrying out my process I use, by preference, that kind of sugar which, like grape-sugar, invert sugar, maltose, &c., is easily decomposed by alkaline substances at the ordinary temperature, but other kinds, like cane-sugar, starch, dextrine, &c., which at high temperature and by long-continued reaction yield products equally serviceable. For the alkaline reaction alkaline earths, ammonia, and alkaline carbonates, are used, also the alkaline sulphides of those bodies, or oxide of lead. If, for instance, one of the above-mentioned substances, as lime, or caustic soda, reacts upon a watery solution of grape-sugar or invert sugar, the latter is at first very rapidly decomposed at ordinary temperature, the solution becomes brown, and a large part of the base contained in it combines with the products of decomposition. It takes considerable time, however, before the decomposition is complete, sometimes several weeks, when the quantity of alkali remains constant.

By raising the temperature the decomposition is accelerated, but the solution is colored so dark that it is with difficulty clarified by animal charcoal. Solutions of lighter color are, however, obtained and the process accelerated by adding to the mixture a small quantity of a metallic oxide capable of giving up oxygen, such as the oxides of copper, manganese, vanadium, &c., and also by forcing a current of air through the liquid while slightly raising the temperature of the same.

When by any of those methods the decomposition of the sugar is effected, the resulting solution is freed from the excess of alkali, purified and cleared by bone-coal, and sufficiently acidulated by a mineral acid, so as to cause a maximum weight of antimony oxide to be taken up by the subsequent heating with this substance. The degree of acidity must be determined by a preliminary test. The heating with antimony oxide is carried on at about 40° centigrade.

Instead of acidulating by an acid, the same effect may also be produced by the addition, to the neutralized solution of acid, antimony compounds, such as the trichloride or sulphate.

When the presence in the product of the base used for the decomposition of the sugar is not desirable, it is removed in the usual way.

The resulting antimony solution is concentrated to any desirable degree at as low a heat as possible, by preference, in a vacuum. Example: One hundred kilograms of grape-sugar are dissolved in three hundred liters of water, one hundred kilograms lime-water of twenty per cent. lime added, and the whole kept at ordinary temperature for four weeks. The excess of lime is then precipitated by carbonic acid, or the solution is first acidulated with hydrochloric acid and the lime precipitated by sodium carbonate. It is then filtered, the solution acidulated with thirty kilograms of hydrochloric acid of 20° Baumé, and heated with antimony oxide at 40° centigrade; or, one hundred grams of oxide of copper are added to the same quantities above mentioned, and a current of air passed through the solution, first at 20° centigrade, gradually raising the temperature to 40°. The further treatment is the same as above.

In place of sugar inverted molasses, or starch transformed into sugar by malt extract, or equivalent substances, may be used.

What I claim as my invention, and desire to secure by Letters Patent, is—

1. The process of producing soluble antimony compounds, which consists in decomposing sugar or equivalent carbon hydrates by alkaline bodies, acidulating the solution, and then treating the same with an antimony compound, substantially as specified.

2. The process of producing soluble antimony compounds, which consists in decomposing sugar or equivalent carbon hydrates by alkaline bodies with the assistance of a current of air, acidulating the solution, and then treating the same with an antimony compound, substantially as specified.

3. The process of producing soluble antimony compounds, which consists in decomposing sugar or equivalent carbon hydrates by alkaline bodies, with the assistance of metallic oxides, acidulating the solution and then treating the same with an antimony compound, substantially as specified.

4. The process of producing soluble antimony compounds, which consists in decomposing sugar or equivalent carbon hydrates by alkaline bodies, with the assistance of a current of air and metallic oxides, acidulating the solution and then treating the same with an antimony compound, substantially as specified.

OTTO PRINZ.

Witnesses:
BERTHOLD FINKELSTEIN,
HERMANN NAUNDORF.